United States Patent Office 3,691,041
Patented Sept. 12, 1972

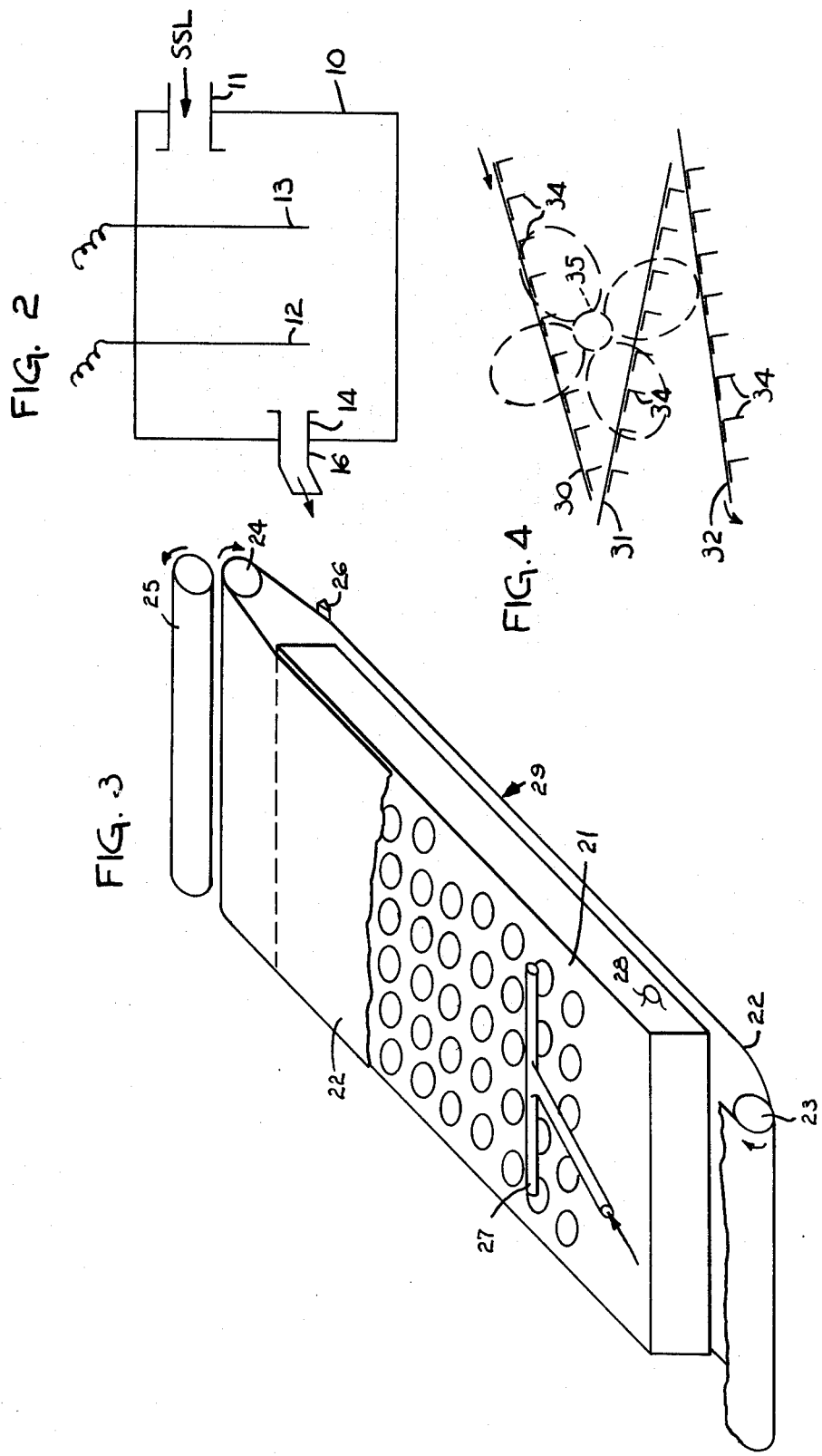

3,691,041
RECOVERING WATER FROM SPENT
SULFITE LIQUOR
Bernard J. Stralser, 12726 E. Apache Pass,
Spokane, Wash. 99206
Filed May 3, 1971, Ser. No. 139,655
Int. Cl. B01k 3/00
U.S. Cl. 204—152
4 Claims

ABSTRACT OF THE DISCLOSURE

Spent sulfite liquor used in the calcuim base sulfite pulping process is diluted by about six parts water to one part of spent liquor as it exists in the pulp. To recover the water for re-use, the pH of the diluted liquor is first adjusted to about 6.4 by addition of 30% NaOH. The liquor is then put in an electrolytic cell having electrodes of mild steel about ½ inch apart and is subjected to direct current voltage of about 27–36 volts between electrodes with enough current to bring the temperature within a range of 140° F. to 200° F. in about two minutes. Current is cut off and the liquid is cooled for two to five minutes to enable a dark green precipitate to form. Then, the liquid is filtered. The recovered liquid is brought to a pH of 11 using NaOH and then is subjected to direct current of 30 volts in a second electrolytic cell having a mild steel cathode and a lead dioxide anode ½ inch apart, until the temperature is again raised to between 140° F. and 200° F. The treated liquid is allowed to cool to form another dark green precipitate. This is again filtered. Then, the cooled liquid is neutralized, using sulfuric acid, to a pH of 7. A white precipitate forms and is filtered out. The water remaining is now re-usable.

BACKGROUND OF THE INVENTION

This invention relates to the treating of spent calcium sulfite pulping liquor.

One of the principal processes for producing pulp from wood is the cadmium base sulfite process in which the cellulose fibers are obtained by treating wood with bisulfite-sulfurous acid solution. Mr. Benjamin Chew Tilghman was granted U.S. Pat. No. 70,485 on the original process in the late 1800's. The process of pulping or delignification of wood is usually carried out on an industrial scale by using a large cylindrical vessel with a conical bottom called a digester of such size that one batch will produce 12 to 35 tons of pulp. After the wood chips are placed in the digester, the calcium bisulfite-sulfurous acid liquor is pumped into the digester. Heat is introduced to cook the wood chips. The temperature, and pressure are carefully controlled to permit the calcium bisulfite as well as the sulfurous acid components of the cooking liquor to defuse into the wood chips.

After proper digestion, a large valve at the bottom of the digester is opened to allow the contents to flow into a blowpit. The sulfite spent liquor is drained through the bottom of the blowpit.

A calcium base sulfite spent liquor is predominantly water but contains nonvolatile solids in concentrations usually up to about 8% to 12%. These solids will be about 60% calcium lignin sulfonate and about 20% hexose and pentose sugars from hemicellulose hydrolysis. The remaining solids will be a residual calcium bisulfite together with some other inorganic salts such as calcium sulfate and small amounts of other organic substances. The spent liquor is of an acidic character having a pH of about 4.5 when diluted by six parts of water to one part of spent liquor.

All to often, the spent liquor is discharged into a sewer system or directly into streams or lakes causing substantial contamination and degradation to the ecological system in the receiving body of water.

Over the many years, considerable effort has been directed toward developing economical methods for the treating and removal of the solid material and rejuvenation of the water so that the water can be discharged with no contamination effect on the receiving body of water or to reuse the water.

The principal object of this invention is to provide a process and an apparatus for treating the spent liquor from a calcium base sulfite pulping operation to remove the objectional solids therefrom and rejuvenate the water to such a quality that it may be discharged into bodies of water with little or no contamination effect or reused in the pulping process.

Considerable effort has been expended in devising evaporation processes for treating the spent liquor to evaporate the water and obtain the solids in a concentrated solution so that they can be burned. However, scale forms very readily during the evaporation process. Furthermore, when tht solids are burned, small particles are emitted into the air to create an air pollution problem.

This invention is restricted to the precipitations and chemical treatment of a very specific industrial by-product, namely spent liquor from a calcium base sulfite pulping operation and must be considered as such. This invention involves the general well-known mechanism of cataphoresis and electrolytic dissociation of water. However, the invention utilizes these mechanisms in a unique and limited manner for treating the above described spent liquor.

The use of electric current passing between electrodes immersed in a water solution and suspension of contaminants has been known for many years. The U.S. Pat. No. 1,139,778 to Landreth has a general discussion of such use. Another early patent, No. 1,392,524 to Puiggari and Venezia contains a substantial discussion of the use of high voltage between electrodes to cause electric cataphoresis, that is, the migration of positive colloids to the cathode and the migration of negative colloids to the anode and precipitation of these solids as compound coagulated colloids. Other specific patent disclosures of interest as background are found in the following U.S. patents: Smiley, 2,456,897; Choppell, 3,010,886; Litt, 3,236,757; Mehl, 3,335,078; Neidl, 3,336,220, Gunther, 3,440,157; Gibson et al., 3,463,707; Kikindai et al., 3,479,281.

An object of this invention is to provide a new and improved process and equipment for flocculating the substantially colloidal and suspended solids contained therein and for electrolytic dissociation of water and of dissolved organic or inorganic materials, some of which may tend to form a precipitate which is contained within the floc while other material may form gases that dissociate within the liquid and may combine therein to synthesize new compounds for the treatment of the dissolved and suspended solids. The principles upon which this invention is based are well known and are applied in a new and unique manner herein.

The process combines the principles of cataphoresis and eletcrolysis wherein the positive colloidal ions migrate towards the cathode while the negative colloidal ions migrate toward the anode wherein during the travel the colloids and particles coalesce around the nuclei introduced into the liquid and coagulate forming a floc. The hydroxy ions which are formed during the electrolytic process, discharge or tend to discharge at the anode, liberating oxygen with the consequent bleaching action demand which occurs plus the reduction in the biochemical oxygen (BOD) caused by the organics. Simultaneously, the electronegative particles such as sulfur and sulfides plus celluosics and lignenes migrate to the anode. In addition, there is a formation of sulfuric acid in situ in the solution which under the action of the electrolysis releases not only oxygen, but ozone as well.

An additional object of this invention is to provide a process and an apparatus for treating cadmium base sulfite spent liquor from a pulping operation that is commercially feasible requiring a rather minimum of equipment to perform the process.

BRIEF DESCRIPTION OF THE DRAWINGS

FIG. 2 is a diagrammatic view of a treating cell showing the relation of the electrodes to the inlet and outlet of the spent sulfite liquor;

FIG. 3 is a perspective view of a filter unit used; and

FIG. 4 is a diagrammatic showing of the cooling tower used.

GENERAL DESCRIPTION

Figure 1:
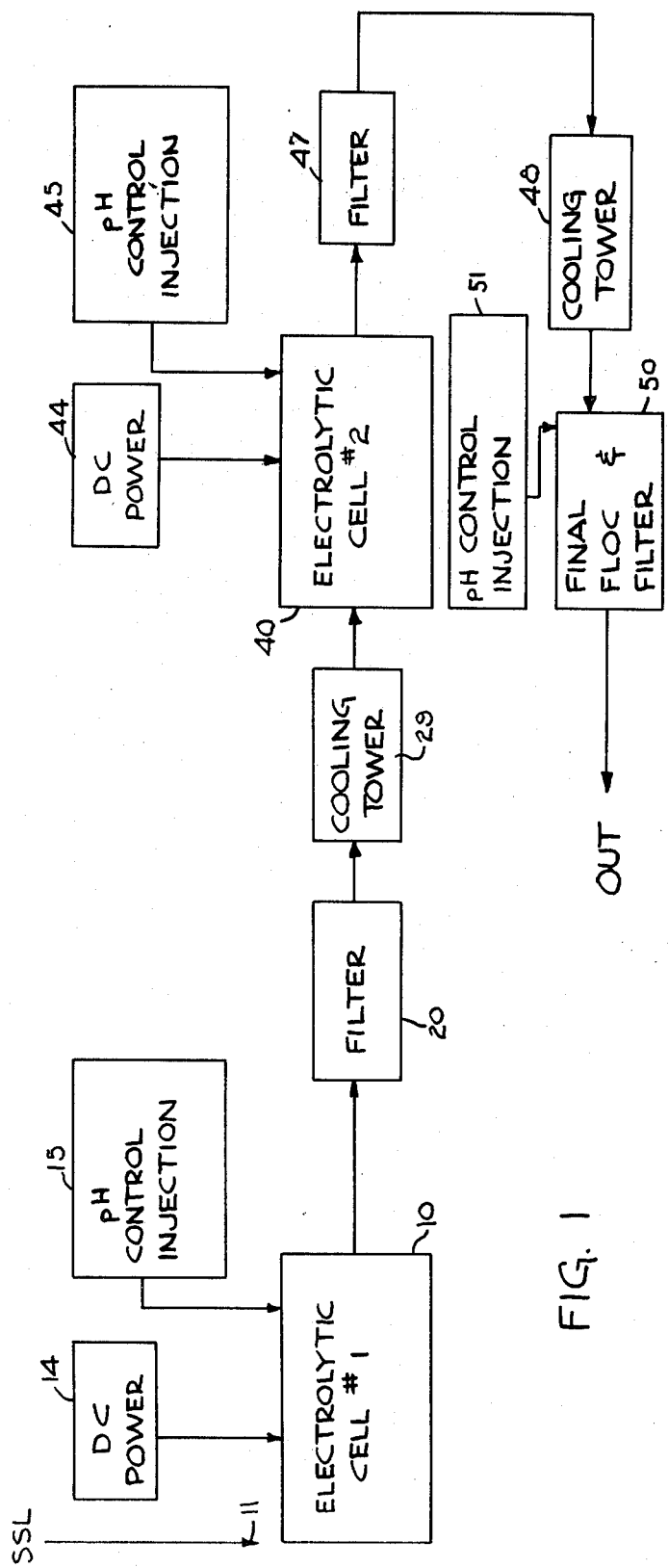
FIG. 1 is a flow diagram illustrating the several steps of the process.

As previously mentioned, this is a process for treating spent liquors from a calcium base sulfite pulping operation. This process is to be distinguished from processes for treating spent liquors from ammonia base sulfite pulping liquors, magnesium base sulfite pulping liquors, and sodium base sulfite pulping liquors. For purpose of brevity, the spent liquor will be referred to by the initials SSL.

Frequently, wash water from the pulping operation is added to the digester spent liquid to form a diluted spent liquor. For purposes of providing a rather uniform starting material, additional water is added to the spent liquor to provide a diluted spent liquor by combining approximately six parts of water to each part of digester spent liquor. The diluted spent liquor generally has a pH in the neighborhood of 4.5. The temperature generally varies from ambient (70° F.) to approximately 120° F. Some samples show a biochemical oxygen demand of approximately 3,500 mg. per liter.

The initial step of this process, assuming that the appropriate dilution was accomplished by the pulping system wash water is to add a soluble alkaline hydroxide material, preferably sodium hydroxide (NaOH) of sufficient quantity to decrease the acidity of the SSL to approximately 6.4 pH.

The next step is to apply electrical energy through the SSL having a voltage of from 27 volts to 36 volts, preferably about 30 volts, and sufficient direct current to raise the temperature of the SSL to a temperature between 139° and the boiling point of the SSL solution in a relatively short period of time. The electrical energy is applied through an erodable mild steel cathode and a mild steel anode. A direct current of approximately 70 amperes has been found to be particularly effective. A current concentration of 2 amperes per square inch of electrode surface has been found to raise the temperature of the SSL initially at 75° F. to 140° F. in two to three minutes. It is found that color of the SSL turns dark green in color while the electrical energy is applied through the SSL. When the SSL has reached the desired temperature, the application of the electrical energy is treminated. After a short period of time, of one or two minutes, a heavy open flocculent precipitate forms that is also dark green and which settles rapidly.

The SSL is then filtered to remove the dark green flocculent precipitate. Caution should be exercised not to substantially agitate the SSL after the dark green flocculent precipitate has formed. If the SSL is vigorously agitated, the flocculent precipitate will not reform.

It has been found that agitation of the limited degree associated with gravity flow will not prevent the formation of the dark green flocculent precipitate.

After the removal of the dark green flocculent precipitate, the SSL is amber in color and is basic in character having a pH of about 8.7.

The next step involves the further addition of a soluble alkaline hydroxide, preferably sodium hydroxide (NaOH) to the SSL to increase the pH to between 10 and 11 and preferably closer to 11. The SSL is then cooled to a temperature of about 120° F. or below.

Subsequently DC eelctrical energy is applied again through the SSL with a direct current density of approximately 2 amperes per square inch of electrode surface at a voltage of between 27 and 36 volts, utilizing a lead dioxide ($PbO_2$) anode and an erodable mild steel cathode. The electrical energy is applied until the temperature of the SSL reaches a desired temperature of between 140° F. and the boiling point of the SSL and preferably about 200° F. It was found under the preferred conditions, the temperature of the SSL rose to 200° F. in about one minute, with the SSL turning dark green.

After termination of the application of electrical energy, a second dark green open flocculent precipitate formed.

The SSL is then treated to remove the flocculent precipitate, preferably by filtering. After filtration, the SSL has a pH of about 9.5 to 10.5.

After the dark green flocculent precipitate is removed a soluble acidic material, preferably sulfuric acid, is added in quantities sufficient to lower the pH of the SSL to approximately 7. As the pH is lowered, a white fine precipitate forms which may be filtered out by a No. 42 fine ashless filter. The resultant liquid is clear and substantially devoid of color and odor. Samples show that the liquid contains approximately 8.0 mg. of dissolved oxygen per liter and a biochemical oxygen demand (BOD) of approximately 3.0 mg. per liter.

It is very important the SSL must turn a dark green to produce a flocculent precipitate that is readily filterable. If the SSL turns a dark brown, or black during the application of electrical energy then the resulting precipitates is very tight and virtually unfilterable.

A specific example of the utilization of the process was carried out as follows:

Spent sulfite liquor was used from a local paper plant using the calcium based acid sulfite pulping process wherein the amount of spent sulfite liquor at digesting strength was diluted with six parts water to one part liquor to form a 1200 ml. sample. The sample had a BOD of approximately 6,500 mg. per liter. The liquor after dilution contained 6% by weight of dissolved solids. Its pH was adjusted to 6.4 using NaOH. This diluted liquor was placed in a cell having an anode and a cathode both of mild steel and each having an area of 35 square inches. Direct current of about 70 amperes was passed through the solution from electrode to electrode and a voltage drop of 31 volts was maintained between the electrodes which were spaced apart one-half inch. The liquid was electrolized for 2 minutes in the cell, at which time it had not boiled but was at a temperature of about 180° F. The current was then cut off and the liquid was drained into a holding tank where it cooled for about two minutes. The liquid, when drained, was dark green in color. A heavy flocculent precipitate settled rapidly in the tank and the liquid was decanted off through a coarse filter. This liquid was amber in color and had a pH of 8.7. The liquid was treated with NaOH to raise the pH to 10.5. Then, this alkaline liquid was placed in a second cell having a cathode of mild steel and an anode of lead dioxide. These electrodes being spaced apart about ½ inch. Current was applied between the electrodes at a voltage of 30 volts between electrodes. The current was such that the temperature rose to above 180° F. in ¾ minute and was turned off. This liquid was dark green again. It was moved immediately to another holding tank. A dark green flocculent precipitate formed in about 30 seconds and settled downward in the liquid. The liquid was filtered and now had a pH of 10.

To neutralize the liquid a minute amount of sulfuric acid was added to it. Two drops in 1200 ml. brought the liquid down to a pH of 7. A white precipitate formed after cooling which was removed by filtering the liquid through a number 42 fine ashless filter.

After filtering, the liquid was colorless and no odor like the original odor of the spent sulfite liquor could be detected.

The recovered liquid was tested for dissolved oxygen content. This was 8.0 mg. of oxygen per liter. The biochemical oxygen demand, which was approximately 6500 mg. per liter in the spent sulfite liquor was only 3.0 mg. per liter in the recovered liquid.

It is evident from the foregoing example that the liquid remaining after treatment by the process described hereinbefore can be recycled to the wood digesting process or discharged into a body of water without contamination effect. The process is simple and is capable of being carried out with a minimum of discharge of pollutant vapors into the atmosphere.

The apparatus for performing the process previously described is illustrated in block diagram form in FIG. 1, with several components shown diagrammatically in FIGS. 2-4. Initially, the SSL is fed to a first electrolytic cell 10 having an inlet 11 and an outlet 16 in which the outlet is positioned vertically below the inlet a prescribed distance to provide gravity flow through the electrolytic cell 10. A cathode 12 and an anode 13 are mounted in the cell extending into the liquid for applying electrical energy in the form of direct current through the liquid. The cathode and anode are connected to a DC power source 14. A feed means 15 is associated with the electrolytic cell 10 for adding a soluble alkaline hydroxide such as sodium hydroxide to the electrolytic cell 10. Both the cathode and the anode are constructed of an electrolytic erodable mild steel for transferring the electrolytic energy through the SSL.

From the electrolytic cell 10 the SSL is passed through a filter 21 for removing the dark green flocculent precipitate therefrom. A specific configuration of the filter is illustrated schematically in FIG. 3. The filter 20 has a trough 21 with a continuous Fourdrinier screen belt 22 encircling the trough as shown. The continuous screen belt is movably mounted on an idle roller 23 adjacent one end of the trough and a drive roller 24 adjacent the other end of the trough. A splash roller is mounted adjacent the drive roller 24. A scraper 26 is used along the bottom flight of the screen belt for scraping the flocculent precipitate from the screening material. The SSL is distributed onto the upper flight of the screen above the trough 24 by a spreader 27. The trough 21 has an outlet 28 for discharging the SSL after it is passed through the screen belt 22.

From the filter 20 the SSL is passed to a cooling tower 29. The cooling tower 29 has several sloping sheets 20, 31 and 32 that are arranged in serpentine descending arrangement so that the SST will flow over the sheets and cascade down from one sheet to another to lower the temperature of the SSL. Each of the sheets 31-32 has fins 34 mounted thereto for efficiently transferring the heat to the surrounding air. A fan 35 is provided to pass the air over the sheets and the fins to sufficiently cool the liquid.

After the liquid is cooled to a temperature below 120°, it is sent to a second electrolytic cell 40. In the second electrolytic cell, a feed means 45 is provided to feed soluble alkaline hydroxides into electrolytic cell to increase in the pH of the SSL in the cell 40 to between 10 and 11. The electrolytic cell 40 has an erodable mild steel cathode and a lead dioxide ($PbO_2$) anode. A DC power source is provided to pass electrical energy through the SSL. The DC power source is provided to pass electrical energy through the SSL. The DC power source is designed to provide a current density of about 2 amperes per square inch on the electrodes with a voltage difference of between 27 and 36 volts. The electrodes are positioned approximately ½ inch from each other. Preferably, the DC power source 44 provides 70 amps at approximately 31 volts between the electrodes. It is important that the cathode be constructed of an eroding steel electrode to provide and introduce into the fluid an iron nucleus to establish the floc when the proper conditions are present. After SSL temperature has been raised to the desired temperature by the application of sufficient electrical energy to turn the SSL to a dark green colorization. The application of electrical energy is discontinued to allow the SSL to form a heavy flocculent precipitate which has a dark green colorization. From the electrolytic cell 40, the liquor is transferred to a filter 47 which may be constructed in a similar design to the filter 20. After filterization, the SSL is passed through a cooling tower 48 and then to a holding tank 50. In the holding tank 50, feed means 51 delivers sulfuric acid to the holding tank 50 to reduce the pH for the SSL to approximately neutral or 7 pH. As the pH of the SSL is lowered a white precipitate is formed having a very fine granular characteristic. As the liquid is discharged from the holding tank, it is filtered to remove the white precipitate.

It should be understood that the above described embodiment is simply illustrative of the principles of this invention and numerous other embodiments may be readily devised by those skilled in the art without deviating therefrom. Therefore, only the following claims are intended to define this invention.

What is claimed is:

1. A process of reclaiming water from spent sulfite liquor derived from calcium-base acid sulfite pulping of wood which comprises:
   (a) adding a soluble hydroxide to the liquor of sufficient quantity to adjust the pH of the liquor to approximately 6.4;
   (b) directing DC electrical energy through the liquor of sufficient magnitude with a voltage potential between electrodes of 27 to 36 volts until the liquor is heated to at least 139° F. but below boiling temperature and for a duration sufficient to allow the liquor to turn dark green;
   (c) terminating the application of the electrical energy and allowing the liquor to cool with a formation of a heavy flocculent precipitate;
   (d) filtering out the precipitate;
   (e) adding a soluble hydroxide to the filtered liquor to increase the pH to about 10 to 11;
   (f) directing DC electrical energy through the liquor of sufficient magnitude with a voltage potential between electrodes of 27 to 36 volts until the liquor is heated to a temperature of at least 139° F. but below boiling temperature and for a duration sufficient to allow the liquor to turn dark green;
   (g) terminating the application of the electrical energy to the liquor and allowing the liquor to cool with a minimum of agitation to form a second dark green heavy flocculent precipitate;
   (h) filtering out the second precipitate;
   (i) adding enough sulfuric acid to the resulting filtered liquor to bring its pH to about 7 to form a white precipitate; and (j) filtering out the white precipitate to leave a clear re-usable water.

2. The process defined in claim 1, wherein the electrical energy directed through the liquor in step (b) is directed through an erodable iron cathode that ejects iron ions into the liquid to provide nuclei to facilitate the formation of the flocculent precipitate.

3. The process as defined in claim 1 wherein between steps (c) and (f) the liquor is cooled to a temperature below 120° F.

4. The process as defined in claim 1 wherein the electrical energy is applied through the liquor in step (f) utilizing a lead dioxide anode.

References Cited

UNITED STATES PATENTS

| 1,069,169 | 8/1913 | Parker | 204—269 XR |
| 1,505,104 | 8/1924 | Moerk | 204—149 |
| 3,162,587 | 12/1964 | Zubryckyj | 204—92 |

HOWARD S. WILLIAMS, Primary Examiner

A. C. PRESCOTT, Assistant Examiner

U.S. Cl. X.R.

204—149, 130